(12) United States Patent
Jeong

(10) Patent No.: US 12,535,500 B2
(45) Date of Patent: Jan. 27, 2026

(54) TEST PIN

(71) Applicant: AWESOMENICS INC., Asan-si (KR)

(72) Inventor: Woo Yoel Jeong, Cheonan-si (KR)

(73) Assignee: AWESOMENICS INC., Asan-si (KR)

( * ) Notice: Subject to any disclaimer, the term of this patent is extended or adjusted under 35 U.S.C. 154(b) by 167 days.

(21) Appl. No.: 18/658,894

(22) Filed: May 8, 2024

(65) Prior Publication Data

US 2024/0288470 A1    Aug. 29, 2024

Related U.S. Application Data

(63) Continuation of application No. PCT/KR2022/017313, filed on Nov. 7, 2022.

(30) Foreign Application Priority Data

Jan. 11, 2022 (KR) .......................... 10-2022-0003733

(51) Int. Cl.
  *G01R 1/067*    (2006.01)

(52) U.S. Cl.
  CPC ..... *G01R 1/06722* (2013.01); *G01R 1/06733* (2013.01)

(58) Field of Classification Search
  CPC .......................... G01R 1/06722; G01R 1/06733
  See application file for complete search history.

(56) References Cited

U.S. PATENT DOCUMENTS

| 2008/0100325 A1* | 5/2008 | Sinclair ................ G01R 1/0483 |
| | | 324/755.05 |
| 2014/0235103 A1* | 8/2014 | Mason ................... H01R 24/38 |
| | | 439/607.08 |
| 2017/0160311 A1* | 6/2017 | Unokuchi .......... G01R 1/07314 |

FOREIGN PATENT DOCUMENTS

| JP | 2003344006 A | 12/2003 |
| JP | 2012181096 A | 9/2012 |
| KR | 1020120002264 A | 1/2012 |
| KR | 1020160109587 A | 9/2016 |
| KR | 101957929 B1 | 3/2019 |
| KR | 102080592 B1 | 4/2020 |
| KR | 1020200095113 A | 8/2020 |
| KR | 102166677 B1 | 10/2020 |

\* cited by examiner

*Primary Examiner* — Stephanie E Bloss
*Assistant Examiner* — Michael A Harrison
(74) *Attorney, Agent, or Firm* — NKL Law; Jae Youn Kim

(57) ABSTRACT

Provided is a test pin for inspecting the presence of an electrical defect in a semiconductor and a camera module, the test pin comprising: a top plunger which is in contact with an object to be inspected to transmit an electrical signal thereto, and detects an output signal output from the object to be inspected; and a bottom plunger which transmits, to the top plunger, an electrical signal received from inspection equipment and transmits, to the inspection equipment, a monitoring signal detected by the top plunger, wherein the bottom plunger adopts a double spring structure and thus is configured to elastically support a load applied from the top plunger, such that the object to be inspected may be precisely inspected for the presence of an electrical defect, and electrical contact of the test pin may be improved, thereby increasing measurement precision.

9 Claims, 8 Drawing Sheets

TEST PIN

TECHNICAL FIELD

The present invention relates to a test pin, and more specifically, to a test pin for inspecting an electrical defect in a semiconductor and a camera module.

BACKGROUND ART

In general, after a semiconductor or a camera module is manufactured, an electrical defect is inspected using a test pin or a probe pin (hereinafter referred to as a "test pin").

The test pin functions as an electrical path for connecting an IC electrode to be inspected to a substrate.

For example, one end of the test pin makes contact with a pad inside a wafer chip, and a signal received from main test equipment connected through the other end is transmitted to the wafer chip.

Accordingly, the test pin transmits the signal output from the wafer chip back to the main test equipment.

The test pin is classified into a double pin type in which both plungers are slid, and a single pin type in which only one plunger is slid.

For example, the double pin type test pin includes a pipe-shaped housing, upper and lower plungers installed at upper and lower portions of the housing, respectively, and a coil spring installed within the housing to provide an elastic force between both plungers.

The double pin type test pin configured as described above allows the upper and lower plungers to be relatively slid to approach and be spaced apart from each other, and performs a test on an inspection target by exchanging electrical signals through contact during the approach.

The following Patent Literatures 1 and 2 disclose a test pin technology according to the related art.

Meanwhile, the test pin requires measurement precision of test results for the inspection target, and a plurality of inspection targets are inspected repeatedly, resulting in shortage of lifetime of use.

However, when the number of tests increases, the test pin according to the related art has a problem in that the measurement precision decreases according to the lifetime in use, thereby adversely affecting the yield of the inspection target.

Moreover, in the test pin according to the related art, as the housing, the upper and lower plungers, and the coil spring are provided as respective components and assembled with each other, workability of manufacturing work deteriorates due to an increase in the number of components, and a lot of work time is unnecessarily consumed.

DISCLOSURE

Technical Problem

To solve the problems as described above, an object of the present invention is to provide a test pin capable of precisely inspect an electrical defect in an inspection target such as a semiconductor or a camera module.

Another object of the present invention is to provide a test pin capable of efficiently dissipating heat generate during a test process and improving measurement precision by increasing electrical contact.

Still another object of the present invention is to provide a test pin capable of reducing manufacturing costs and improving workability by minimizing the number of components constituting the test pin.

Technical Solution

To achieve the above object, in order to inspect an electronic defect in a semiconductor and a camera module, a test pin according to the present invention includes: a top plunger which makes contact with an inspection target to transmit an electrical signal, and detects an output signal output from the inspection target; and a bottom plunger which transmits the electrical signal received from inspection equipment to the top plunger, and transmits a monitoring signal detected by the top plunger to the inspection equipment, in which the bottom plunger elastically supports a load applied from the top plunger by adopting a double spring structure.

Advantageous Effects

As described above, according to the test pin according to the present invention, it is possible to precisely inspect an electrical defect in an inspection target such as a semiconductor or a camera module.

That is, according to the present invention, when the top plunger is lifted down while being pressed down during the test process of the inspection target, it is possible to elastically support a load applied from the top plunger by using the bottom plunger having a double spring structure, thereby improving electrical contact of the test pin.

In addition, according to the present invention, it is possible to improve heat generation performance by dissipating heat generated during the test process to the outside through the bottom plunger having a double spring structure.

In addition, according to the present invention, it is possible to improve measurement precision by increasing electrical contact of the test pin using the load applied during the test process.

In addition, according to the present invention, it is possible to reduce manufacturing costs and to improve workability by minimizing the number of components constituting the test pin.

MODE FOR INVENTION

Best Mode

Hereinafter, a test pin according to preferred embodiments of the present invention will be described in detail with reference to the accompanying drawings.

Hereinafter, terms indicating directions such as "left", "right", "front", "rear", "upward", and "downward" are defined to indicate respective directions based on a state illustrated in each drawings.

In the following embodiments, a configuration of the test pin for inspecting an electrical defect in a semiconductor and a camera module will be described.

Obviously, it should be noted that the present invention is not necessarily limited thereto, and may be changed to inspect an electrical defect in various inspection targets.

Embodiment 1

Figure 1:
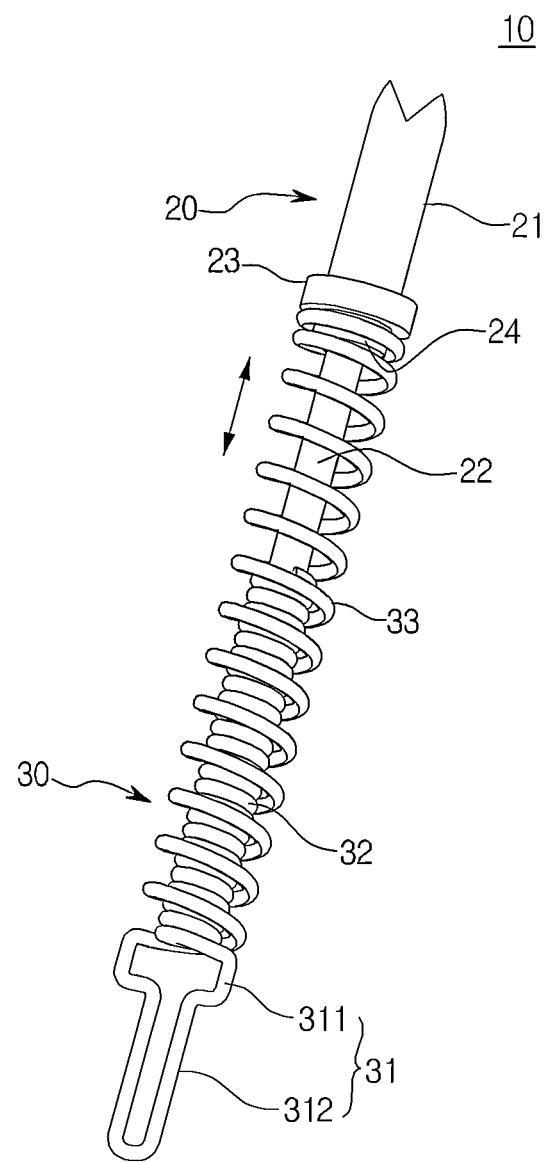
FIG. 1 is a perspective view of a test pin according to a first embodiment of the present invention.
Figure 2:
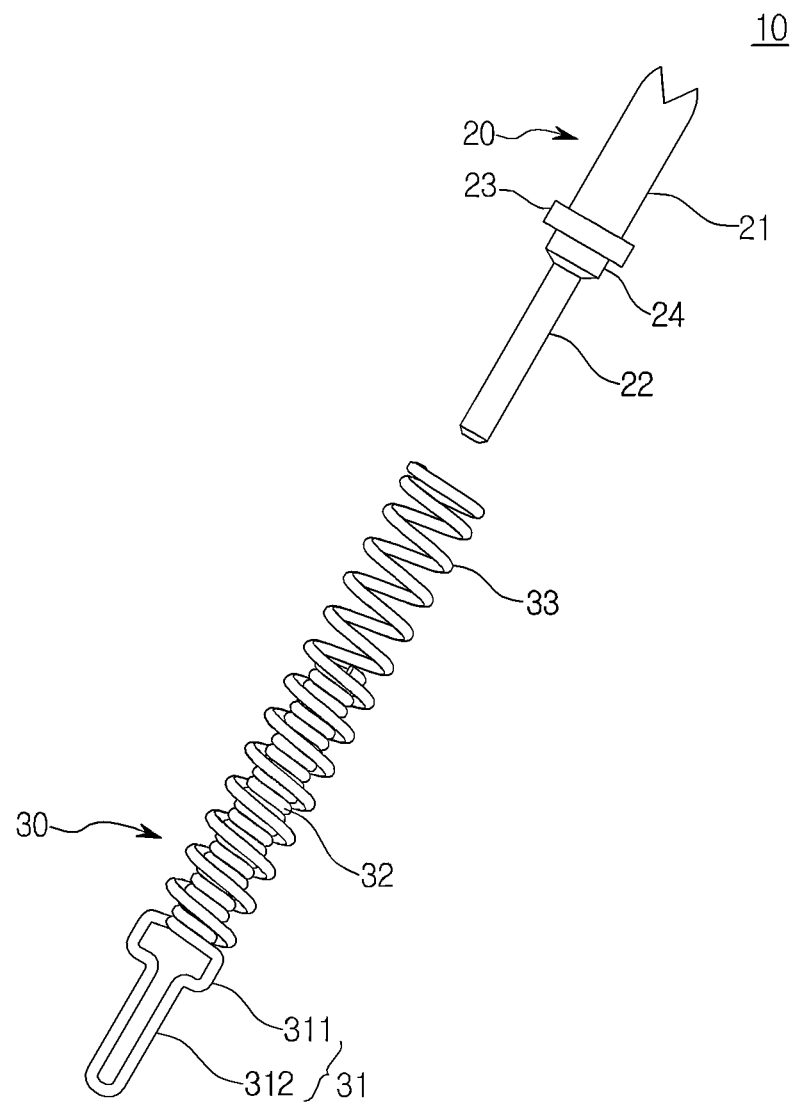
FIG. 2 is an exploded perspective view of the test pin shown in FIG. 1.

FIG. 1 is a perspective view of a test pin according to a first embodiment of the present invention, and FIG. 2 is an exploded perspective view of the test pin shown in FIG. 1.

A test pin 10 according to a first embodiment of the present invention may include: a top plunger 20 which makes contact with an inspection target (not shown) to transmit an electrical signal, and detects an output signal output from the inspection target; and a bottom plunger 30 which transmits the electrical signal received from inspection equipment (not shown) to the top plunger 20, and transmits the signal detected by the top plunger 20 to the inspection equipment, in which the bottom plunger 30 may elastically support a load applied from the top plunger by adopting a double spring structure.

The top plunger 20 may be formed in a column or cylindrical shape as a whole.

The top plunger 20 may include a probe portion 21 which makes contact with the inspection target to transmit the electrical signal to the inspection target and detect the output signal, a coupling protrusion portion 22 which extends from the probe portion 21 toward one side, that is, a lower side when viewed in FIG. 1, and is coupled to the bottom plunger 30, and a flange portion 23 and a fixing portion 24 which are provided between the probe portion 21 and the coupling protrusion portion 22.

A protrusion portion may be formed to be sharp upward on an upper end of the probe portion 21 in order to make contact with the inspection target to transmit the electrical signal and detect the output signal output from the inspection target.

FIG. 1 shows three sharp protrusion portions formed on the upper end of the probe portion 31, but the present invention is not necessarily limited thereto, and may be changed such that one, two, or four or more sharp protrusion portions are formed according to a shape or size of the inspection target.

In addition, the protrusion portion may protrude not only in a sharp shape, but also in various shapes such as an arc-rounded shape.

The flange portion 23, the fixing portion 24, and the coupling protrusion portion 22 are sequentially formed on a lower end of the probe portion 21.

The flange portion 23 is formed with an outer diameter that is larger than an outer diameter of the probe portion 21, the fixing portion 24, and the coupling protrusion portion 22, and the fixing portion 24 may be formed with an outer diameter that is equal to or slightly larger than an inner diameter of an outer coupling portion 33 of the bottom plunger 30.

Therefore, an upper end of the outer coupling portion 33 is fixedly coupled to an outer surface of the fixing portion 24 in a forced fitting manner, and may be supported to a lower end of the flange portion 23.

The coupling protrusion portion 22 is a portion that is slidably coupled to the inner coupling portion 32 of the bottom plunger 30, and may be formed with a diameter that is equal to or slightly smaller than an inner diameter of the inner coupling portion 32 such that the coupling protrusion portion 22 is smoothly inserted into the inner coupling portion 32 to be slid in a vertical direction.

Therefore, the top plunger 20 and the bottom plunger 30 may be electrically connected to each other so as to transmit an electrical signal to each other by coupling of the coupling protrusion portion 22 and the inner coupling portion 32.

The bottom plunger 30 may be formed in a cylindrical shape as a whole.

The bottom plunger 30 may include a jig coupling portion 31 coupled to a jig of the inspection equipment, the inner coupling portion 32 connected to one end of the jig coupling portion 31 and coupled to an inside of the bottom plunger 30 such that the coupling protrusion portion 22 of the top plunger 20 is movably coupled, and the outer coupling portion 33 connected to the other end of the jig coupling portion 31 and fixedly coupled to the fixing portion 24 of the top plunger 20.

The jig coupling portion 31, the inner coupling portion 32, and the outer coupling portion 33 of the bottom plunger 30 may be integrally manufactured using one material.

That is, according to the present embodiment, as the inner coupling portion 32 and the outer coupling portion 33 are formed in spring shapes having mutually different inner diameters, the bottom plunger 30 may have a double spring structure.

In this case, the jig coupling portion 31 may include a pair of bent portions 311 which are doubly bent outward and downward from one end connected to the inner coupling portion 32 and the other end connected to the outer coupling portion 33, respectively, and a pair of extension portions 312 which extend downward from the pair of bent portions 311, respectively.

The pair of bent portions 311 and the pair of extension portions 312 may be disposed symmetrically to each other such that the jig coupling portion 31 may be disposed on the same plane.

Obviously, the present invention is not necessarily limited thereto, and the pair of bent portions 311 and the pair of extension portions 312 may be changed so as to be spaced apart from each other by a predetermined angle, for example, an angle greater than 180° or a small angle, along one side direction with respect to a virtual center line.

Lower ends of the pair of extension portions 312 may be connected to each other.

The inner coupling portion 32 may be provided in a spring shape in which spirals thereof are in close contact with each other such that the inner coupling portion 32 is electrically connected to the coupling protrusion portion 22 of the top plunger 20 to transmit the electrical signal and a detection signal.

That is, the inner coupling portion 32 may be manufactured by tightly winding a part of the material corresponding to the inner coupling portion 32 such that the respective spirals are in close contact with each other.

The outer coupling portion 33 may be formed in a spring shape having an outer diameter that is larger than the outer diameter of the coupling protrusion portion 22 to provide an elastic force to the top plunger 20.

In this case, the upper end of the outer coupling portion 33 may be fixedly coupled to the fixing portion 24 of the top plunger 20, and may provide the elastic force to the top plunger 20 while being supported by the lower end of the flange portion 23.

As described above, the present invention may precisely inspect an electrical defect of an inspection target such as a semiconductor or a camera module.

Next, a coupling relationship and an operation method of the test pin according to the first embodiment of the present invention will be described in detail.

First, a worker integrally manufactures the jig coupling portion 31, the inner coupling portion 32, and the outer coupling portion 33 of the bottom plunger 30 using one material.

Subsequently, the worker couples the top plunger and the bottom plunger to each other.

In this case, the coupling protrusion portion 22 of the top plunger 20 is coupled to an inside of the inner coupling portion 32 of the bottom plunger 30, and the upper end of the outer coupling portion 32 is firmly coupled to the fixing portion 24 provided above the coupling protrusion 22 in a forced fitting manner.

In this case, the coupling protrusion portion 22 of the top plunger 22 may be slid in a vertical direction from the inside of the inner coupling portion 22 of the bottom plunger 20 by a force pressing the top plunger 20 from a top to a bottom.

Subsequently, the worker couples the jig of the inspection equipment to a lower end of the test pin 10, that is, the jig coupling portion 31 of the bottom plunger 30.

The test pin 10 assembled through such a process may inspect an electrical defect of an inspection target such as a semiconductor or a camera module.

That is, the probe portion 21 of the top plunger 20 transmits a signal received from the inspection equipment through the bottom plunger 30 to the inspection target while making contact with the inspection target moving from the top to the bottom, and detects an output signal output from the inspection target.

Then, the bottom plunger 30 receives the detection signal through the inner coupling portion 32 coupled to the coupling protrusion portion 22 of the top plunger 20, and transmits the detection signal again to the inspection equipment through the jig coupling portion 31.

Heat generated from the test pin 10 during the test process of the inspection target is smoothly discharged to the outside through the inner and outer coupling portions 32 and 33 of the bottom plunger 30.

As described above, according to the present invention, heat generation performance may be improved by discharging the heat through the bottom plunger having a double spring structure during the test process.

Meanwhile, the top plunger 20 moves the inspection target downward to be lifted down by a load pressing the top plunger 20 downward.

Then, the outer coupling portion 33 of the bottom plunger 30 is elastically deformed such that a length thereof decreases by a force acting in the vertical direction.

That is, as the load pressing the top plunger 20 during the test work is applied in a vertical direction of an elastic member 40, a force acting between the top plunger 20 and the bottom plunger 30 increases, and as a resistance decreases, efficiency may be improved.

Subsequently, when the force acting on the top plunger 20 is removed after the test of the inspection target is completed, the outer coupling portion 33 is restored to its original length and shape, and the top plunger 20 is lifted up by the restoring force of the outer coupling portion 33.

Through the process as described above, according to the present invention, it is possible to precisely inspect an electrical defect of an inspection target such as a semiconductor or a camera module.

That is, according to the present invention, when the top plunger is lifted down while being pressed down during the test process of the inspection target, it is possible to elastically support a load applied from the top plunger by using the bottom plunger having a double spring structure, thereby improving electrical contact of the test pin.

In addition, according to the present invention, it is possible to improve heat generation performance by dissipating heat generated during the test process to the outside through the bottom plunger having a double spring structure.

Moreover, according to the present invention, it is possible to improve measurement precision by increasing electrical contact of the test pin using the load applied during the test process.

In addition, according to the present invention, it is possible to reduce manufacturing costs and to improve workability by minimizing the number of components constituting the test pin.

Figure 3:
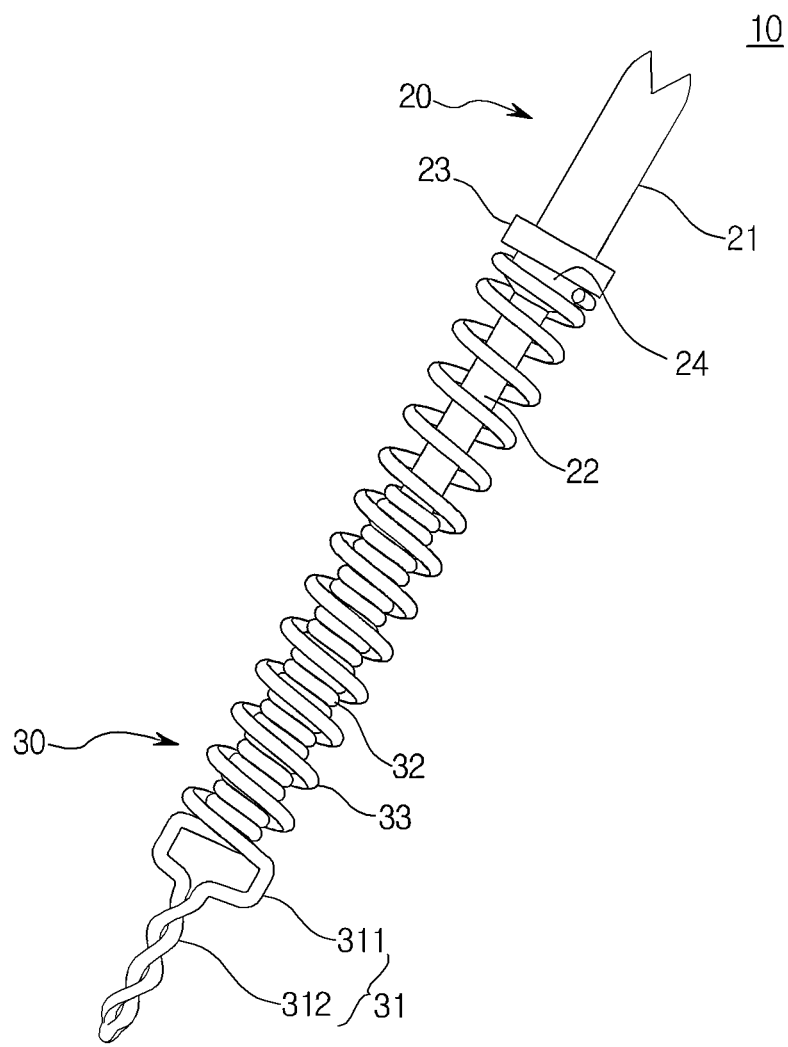
FIG. 3 is a view illustrating a modified example of a jig coupling portion shown in FIG. 1.

Meanwhile, FIG. 3 is a view illustrating a modified example of the jig coupling portion show in FIG. 1.

As shown in FIG. 3, the pair of extension portions 312 provided on a lower end of the jig coupling portion 31 of the bottom plunger 30 may be formed in a shape twisted multiple times.

That is, when the pair of extension portions 312 are formed in parallel to each other as shown in FIG. 1, there is a risk of deformation due to an impact or vibration generated during the test process of the inspection target.

Therefore, according to the present invention, it is possible to increase rigidity of the jig coupling portion 31 by twisting the pair of extension portions 312 as shown in FIG. 3.

As described above, according to the present invention, the rigidity is increased by changing the shape of the jig coupling portion, so that it is possible to prevent deformation due to vibration or impact generated during the test process, and to extend the lifespan of the test pin.

Next, a configuration of a test pin according to a second embodiment of the present invention will be described in detail with reference to FIGS. 4 and 5.

Embodiment 2

Figure 4:
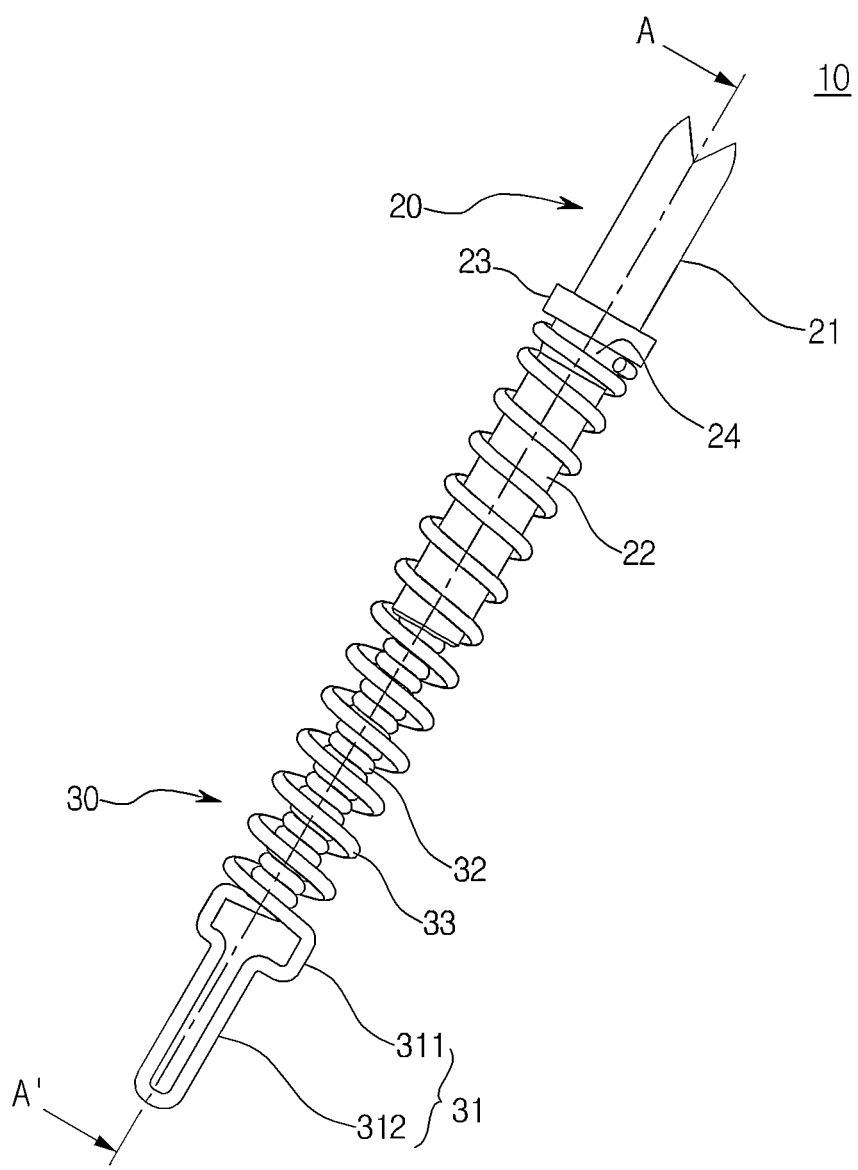
FIG. 4 is a perspective view of a test pin according to a second embodiment of the present invention.
Figure 5:
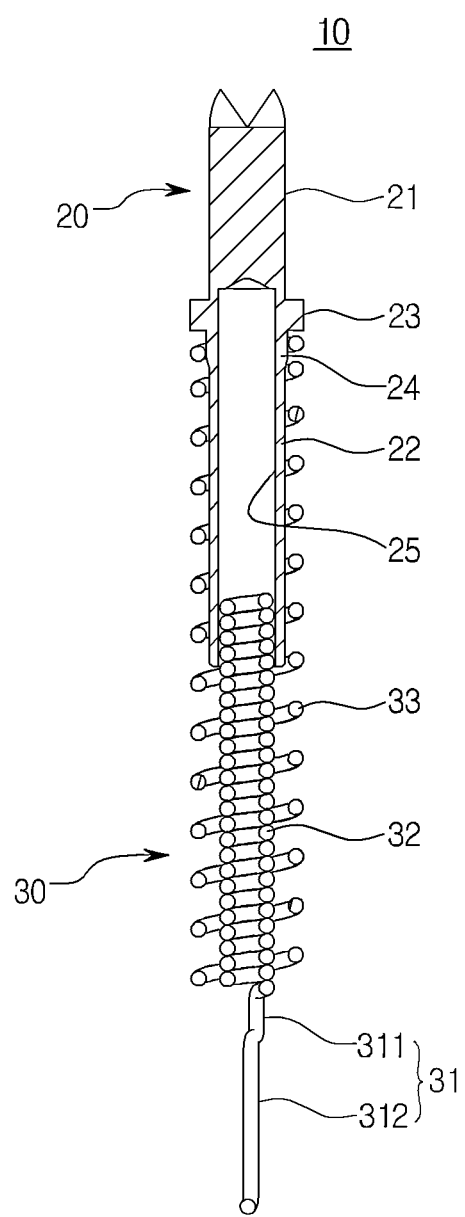
FIG. 5 is a sectional view taken along line A-A' shown in FIG. 4.

FIG. 4 is a perspective view of a test pin according to a second embodiment of the present invention, and FIG. 5 is a sectional view taken along line A-A' shown in FIG. 4.

As shown in FIGS. 4 and 5, the test pin 10 according to the second embodiment of the present invention has the same configuration as the test pin 10 according to the first embodiment, but the inner coupling portion 32 of the bottom plunger 30 is slidably coupled to the inside of the coupling protrusion portion 22 of the top plunger 20.

To this end, a coupling space 25 in which the inner coupling portion 32 is fitted may be formed inside the coupling protrusion portion 22.

In addition, the coupling space 25 may be formed with an inner diameter that is equal to or slightly larger than an outer diameter of the inner coupling portion 32.

Therefore, according to the present embodiment, the bottom plunger 30 may elastically support the load applied from the top plunger 20 by using the outer coupling portion 33 in a state where the inner coupling portion 32 is coupled to the inside of the coupling protrusion portion 22.

Next, a configuration of a test pin according to a third embodiment of the present invention will be described in detail with reference to FIGS. 6 to 8.

Embodiment 3

Figure 6:
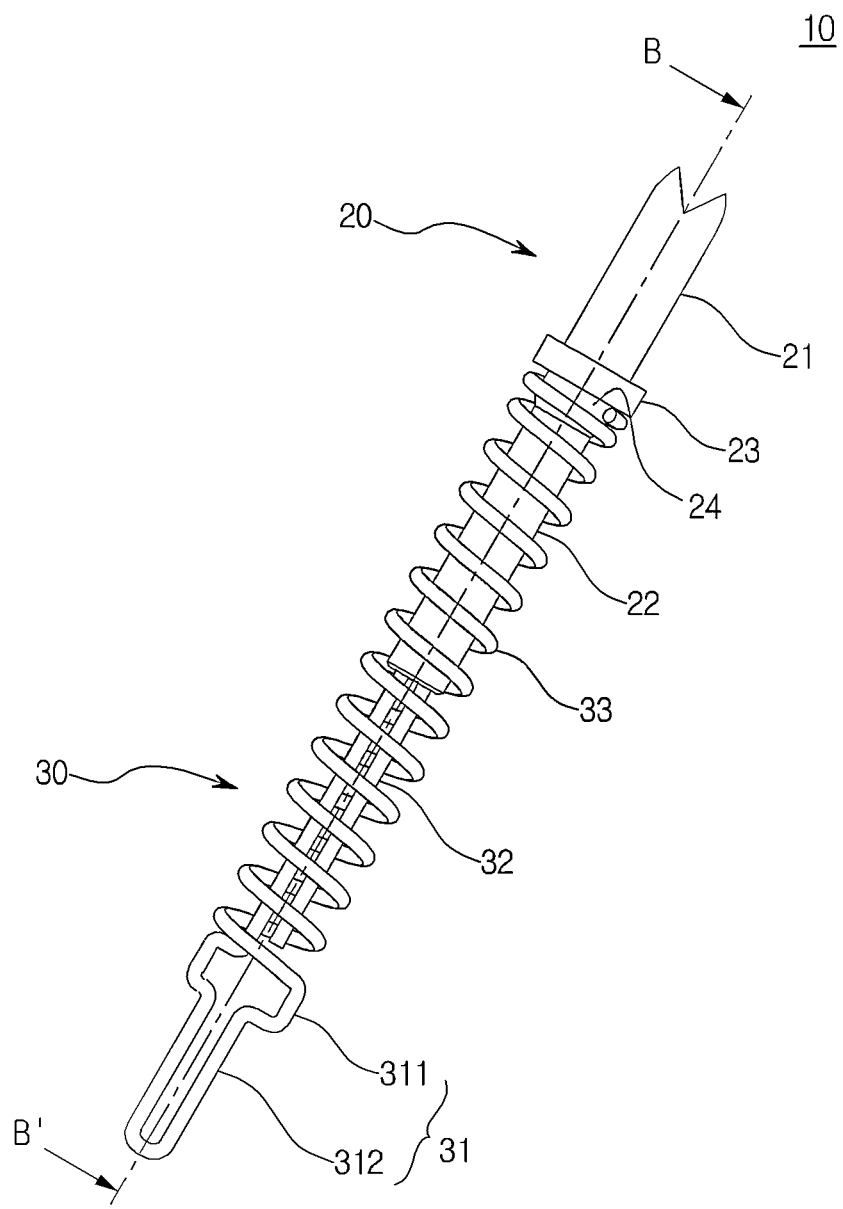
FIG. 6 is a perspective view of a test pin according to a third embodiment of the present invention.
Figure 7:
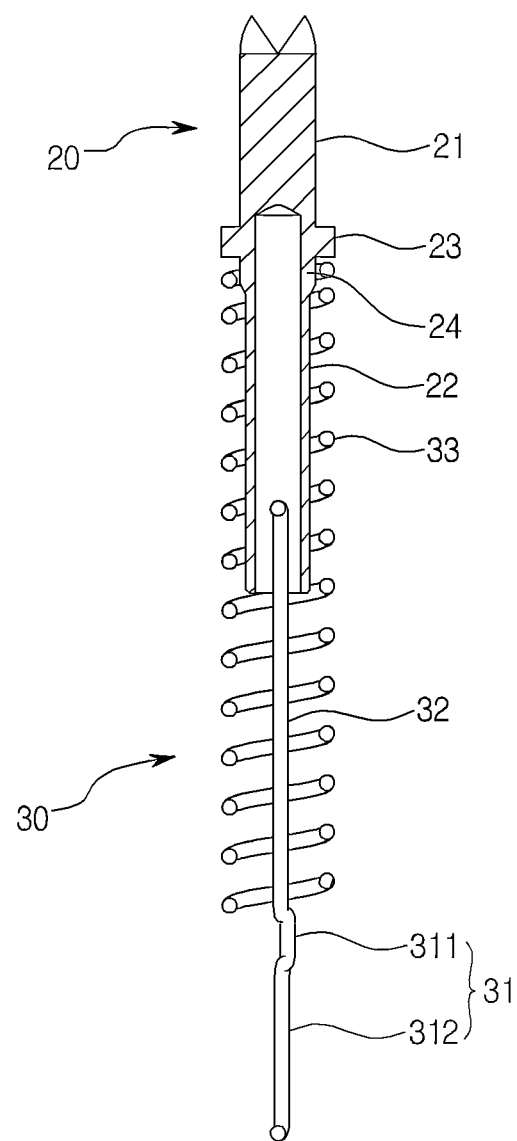
FIG. 7 is a sectional view taken along line B-B' shown in FIG. 6.
Figure 8:
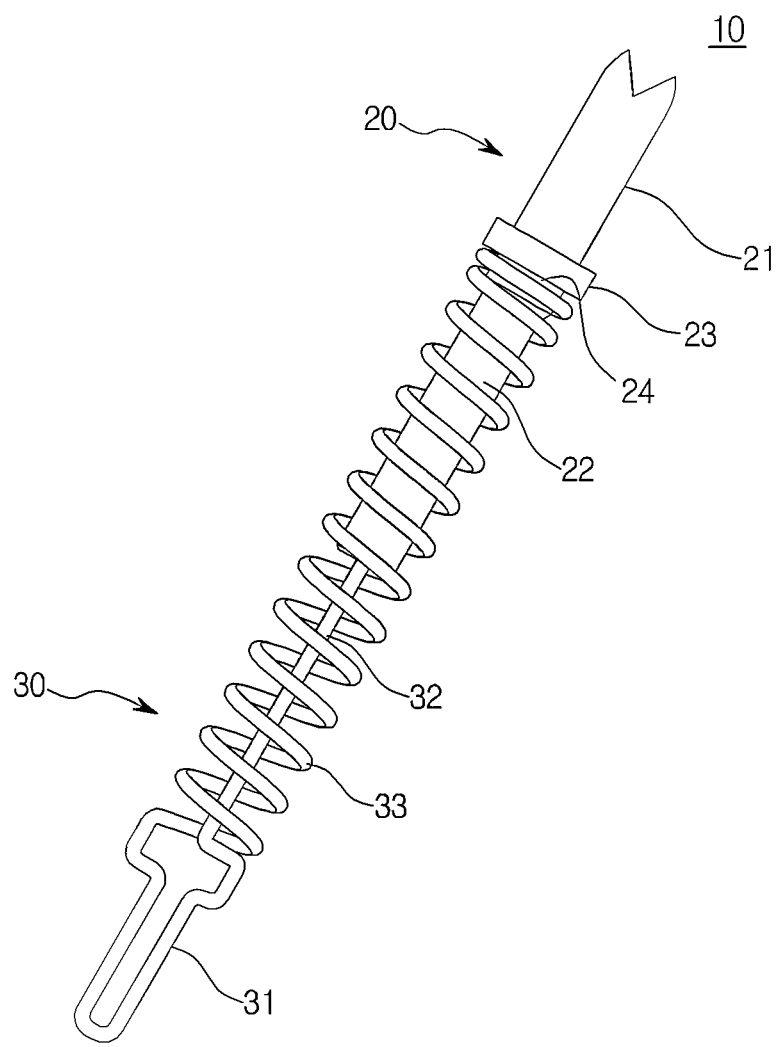
FIG. 8 is a view illustrating a modified example of an inner coupling portion shown in FIG. 6.

FIG. 6 is a perspective view of a test pin according to a third embodiment of the present invention, and FIG. 7 is a sectional view taken along line B-B' shown in FIG. 6.

As shown in FIGS. 5 and 6, in the test pin 10 according to the third embodiment of the present invention, the inner coupling portion 32 of the bottom plunger 30 is slidably coupled to the inside of the coupling protrusion portion 22 of the top plunger 20 in the same manner as the configuration of the test pin 10 according to the second embodiment, but the inner coupling portion 32 may be formed in a bar shape instead of the spring shape.

To this end, a coupling space 25 in which the inner coupling portion 32 is fitted may be formed inside the coupling protrusion portion 22.

The inner coupling portion 32 may extend upward from one end of the jig coupling portion 31, for example, an upper end of the bent portion 311 disposed at a left side between the pair of bent portions 311 when viewed in FIG. 5, and then may extend downward while being bent again toward the jig coupling portion 31.

An upper end portion of the inner coupling portion 32 may be slidably fitted in the coupling space 25 of the coupling protrusion portion 22 in the vertical direction.

In this case, the coupling space 25 may be formed with an inner diameter that is equal to or slightly larger than a width of the inner coupling portion 32 formed in a pair of bar shapes.

Obviously, the present invention is not necessarily limited thereto, and the internal coupling portion 32 may be changed to have one or three or more bar shapes as shown in FIG. 7.

In this case, the coupling space 25 may be formed with an inner diameter that is equal to or slightly larger than the outer diameter of the inner coupling portion 32 formed in one bar shape.

As described above, according to the present embodiment, the bottom plunger 30 may deform the inner coupling portion 32 to have one or more bar shapes instead of the spring shape, and may be slidably coupled to the inside of the coupling protrusion portion 22 of the top plunger 20 to electrically connect the top plunger 20 to the bottom plunger 30.

Meanwhile, according to the above embodiments, it has been described that the probe portion 21 is provided at the upper end of the top plunger 20 and the inspection target moves downward from an upper portion of the probe portion 21, but the present invention is not necessarily limited thereto.

For example, the present invention may be changed to test the inspection target by moving upward from a lower portion of the jig coupling portion 31 using the jig coupling portion 31 provided at the lower end of the bottom plunger 30 as a probe pin, or to test the inspection target by moving upward from a lower portion of the probe portion 21 of the top plunger 20 in a state where the top plunger 20 is disposed on a lower portion of the test pin and the bottom plunger 30 is disposed on an upper portion of the test pin by rotating the test pin 10.

In addition, the present invention may be changed to test the test pin 10 by moving toward the inspection target disposed on the upper or lower portion of the test pin.

Although the present invention invented by the present inventor has been described in detail with reference to the embodiments, the present invention is not limited to the above embodiments, and various modifications are possible without departing from the scope and spirit of the present invention.

The invention claimed is:

1. A test pin for inspecting an electrical defect in a semiconductor and a camera module, the test pin comprising:
    a top plunger which makes contact with an inspection target to transmit an electrical signal, and detects an output signal output from the inspection target; and
    a bottom plunger which transmits the electrical signal received from inspection equipment to the top plunger, and transmits a monitoring signal detected by the top plunger to the inspection equipment,
    wherein the bottom plunger elastically supports a load applied from the top plunger by adopting a double spring structure,
    the top plunger includes a probe portion which makes contact with the inspection target to transmit the electrical signal to the inspection target and detect the output signal, a coupling protrusion portion which extends from the probe portion and is coupled to the bottom plunger, and a flange portion and a fixing portion which are provided between the probe portion and the coupling protrusion portion,
    the flange portion is formed with an outer diameter that is larger than an outer diameter of the probe portion and the coupling protrusion portion, and
    the bottom plunger is integrally manufactured using one material by including a jig coupling portion coupled to a jig of the inspection equipment, an inner coupling portion connected to one end of the jig coupling portion and coupled to an inside of the bottom plunger such that the coupling protrusion portion of the top plunger is movably coupled, and an outer coupling portion connected to the other end of the jig coupling portion and fixedly coupled to the fixing portion of the top plunger.

2. The test pin of claim 1, wherein the inner coupling portion and the outer coupling portion are formed in spring shapes having mutually different inner diameters, respectively.

3. The test pin of claim 1, wherein the outer coupling portion is formed in a spring shape having an outer diameter that is larger than an outer diameter of the coupling protrusion portion to provide an elastic force to the top plunger, and
    an upper end of the outer coupling portion is supported by the flange portion while being coupled to the coupling protrusion portion of the top plunger.

4. The test pin of claim 1, wherein the inner coupling portion is provided in a spring shape in which spirals thereof are in close contact with each other such that the inner coupling portion is electrically connected to the coupling protrusion portion to transmit a signal.

5. The test pin of claim 1, wherein the jig coupling portion includes:
    bent portions which are doubly bent outward and downward from one end connected to the inner coupling portion and the other end connected to the outer coupling portion, respectively; and
    extension portions which extend downward from the bent portions, respectively.

6. The test pin of claim 5, wherein the extension portion is formed in a shape twisted multiple times.

7. The test pin of claim 1, wherein the inner coupling portion is movably coupled to an inside of the coupling protrusion portion.

8. The test pin of claim 7, wherein the inner coupling portion is formed in a single bar shape to be coupled to a coupling space formed inside the coupling protrusion portion.

9. The test pin of claim 7, wherein the inner coupling portion is formed to be bent such that the inner coupling portion is fitted in a coupling space formed inside the coupling protrusion portion, and then is directed toward the jig coupling portion.

* * * * *